DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 341

T875,006

POLYMERIZATION PROCESS USING METAL BOROHYDRIDES AS CATALYSTS

Werner S. Zimmt, Wynnewood, Pa., assignor to E. I. du Pont de Nemours and Company, Wilmington, Del., a corporation of Delaware

Continuation-in-part of application Ser. No. 408,671, Nov. 3, 1964. This application July 26, 1968, Ser. No. 747,804

Int. Cl. C08f *3/64, 3/76*

U.S. Cl. 260—88.7

No Drawing. 11 Pages Specification

A process for the bulk or solution polymerization of acrylic monomers using alkaline metal- and alkaline earth metal borohydrides as catalysts. The process permits control of the steric configuration and physical properties of the resulting polymers.